(12) United States Patent
Kurita et al.

(10) Patent No.: US 10,451,779 B2
(45) Date of Patent: Oct. 22, 2019

(54) POLYGON MIRROR, METHOD FOR MANUFACTURING POLYGON MIRROR, AND REFLECTING MIRROR

(71) Applicant: Brother Kogyo Kabushiki Kaisha, Nagoya-shi, Aichi-ken (JP)

(72) Inventors: Masaaki Kurita, Kasugai (JP); Hirotaka Hirabayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 198 days.

(21) Appl. No.: 15/404,408

(22) Filed: Jan. 12, 2017

(65) Prior Publication Data
US 2017/0205544 A1    Jul. 20, 2017

(30) Foreign Application Priority Data

Jan. 15, 2016 (JP) .................................. 2016-005976

(51) Int. Cl.
*G02B 5/09* (2006.01)
*B29D 11/00* (2006.01)
*G02B 5/08* (2006.01)

(52) U.S. Cl.
CPC .......... *G02B 5/09* (2013.01); *B29D 11/00596* (2013.01); *B29D 11/00865* (2013.01); *G02B 5/0808* (2013.01)

(58) Field of Classification Search
CPC ................................ G02B 5/0808; G02B 5/09
USPC ......... 359/216.1, 218.1, 219.1, 219.2, 217.1, 359/838, 850, 855
See application file for complete search history.

(56) References Cited

U.S. PATENT DOCUMENTS

| | | | | | |
|---|---|---|---|---|---|
| 3,804,485 | A | * | 4/1974 | Clarke | .................... G01S 13/66 359/216.1 |
| 4,121,883 | A | * | 10/1978 | Goshima | ............ G02B 13/0005 359/219.1 |
| 5,130,840 | A | * | 7/1992 | Iima | ......................... G02B 5/09 359/216.1 |
| 5,699,180 | A | * | 12/1997 | Urakawa | ................ G02B 26/12 347/257 |
| 6,775,041 | B1 | * | 8/2004 | Nakajima | ............ G02B 26/124 359/204.1 |

(Continued)

FOREIGN PATENT DOCUMENTS

| | | |
|---|---|---|
| JP | S63-015213 A | 1/1988 |
| JP | 2002-347089 A | 12/2002 |

(Continued)

*Primary Examiner* — Ricky D Shafer
(74) *Attorney, Agent, or Firm* — Banner & Witcoff, Ltd.

(57) ABSTRACT

A polygon mirror includes a substrate having a plurality of side surfaces, a first base surface connecting to the plurality of side surfaces, and a second base surface connecting to the plurality of side surfaces, the first base surface and the second base surface facing away from each other. Each side surface has a first region, and a second region adjoining the first region and extending between the first region and at least one edge of the side surface. The substrate is made of plastic, and a reflection coating is formed on the first region and the second region. A surface roughness of the second region of the substrate is greater than a surface roughness of the first region of the substrate. A method for manufacturing such a polygon mirror and an optical reflecting mirror are also provided.

15 Claims, 11 Drawing Sheets

(56) References Cited

U.S. PATENT DOCUMENTS

| | | | | |
|---|---|---|---|---|
| 8,711,196 B2 * | 4/2014 | Chun | ................ | G02B 5/09 |
| | | | | 347/261 |
| 9,594,196 B2 * | 3/2017 | Hayakawa | ................ | G02B 5/09 |
| 9,778,457 B2 * | 10/2017 | Hayakawa | ................ | G02B 26/12 |
| 9,939,566 B2 * | 4/2018 | Hoshino | ................ | B29C 45/0025 |
| 2004/0246552 A1 * | 12/2004 | Matsui | ................ | G02B 5/09 |
| | | | | 359/216.1 |
| 2005/0134981 A1 * | 6/2005 | Poulsen | ................ | G02B 5/10 |
| | | | | 359/850 |
| 2012/0050443 A1 * | 3/2012 | Lim | ................ | B41J 2/473 |
| | | | | 347/118 |

FOREIGN PATENT DOCUMENTS

| | | |
|---|---|---|
| JP | 2003-005122 A | 1/2003 |
| JP | 2007-256421 A | 10/2007 |

* cited by examiner

POLYGON MIRROR, METHOD FOR MANUFACTURING POLYGON MIRROR, AND REFLECTING MIRROR

CROSS REFERENCE TO RELATED APPLICATIONS

The present application claims priority from Japanese Patent Application No. 2016-005976 filed on Jan. 15, 2016, the disclosure of which is incorporated herein by reference in its entirety.

TECHNICAL FIELD

An aspect of this disclosure relates to a polygon mirror, a method for manufacturing a polygon mirror, and a reflecting mirror.

BACKGROUND ART

A polygon mirror that is made from a plastic substrate in the shape of a prism and having side surfaces on which a reflection coating is formed is conventionally known in the art.

In an optical reflecting mirror such as a polygon mirror made from a substrate on which a reflection coating is formed, it is required that light should be excellently reflected by the surfaces on which the reflection coating is formed, and further that sufficiently high adhesion be achieved between the substrate and the reflection coating.

In view of the above, it would be desirable to provide a polygon mirror and a reflecting mirror in which not only light is excellently reflected but also the adhesion between the substrate and the reflection coating can be improved, and to provide a method for manufacturing such a polygon mirror.

SUMMARY

According to a first aspect, there is provided a polygon mirror comprising a substrate having a plurality of side surfaces, a first base surface connecting to the plurality of side surfaces, and a second base surface connecting to the plurality of side surfaces, the first base surface and the second base surface facing away from each other. Each side surface has a first region, and a second region adjoining the first region and extending between the first region and at least one edge of the side surface.

The substrate is made of plastic, and a reflection coating is formed on the first region and the second region.

A surface roughness of the second region of the substrate is greater than a surface roughness of the first region of the substrate.

According to a second aspect, there is provided a method for manufacturing a polygon mirror which comprises a substrate having a plurality of side surfaces, a first base surface connecting to the plurality of side surfaces, and a second base surface connecting to the plurality of side surfaces, the first base surface and the second base surface facing away from each other, each side surface having a first region, and a second region adjoining the first region and extending between the first region and at least one edge of the side surface.

This method for manufacturing a polygon mirror comprises a substrate formation step for forming the substrate by injecting melted plastic into a mold, and a coating step for forming a reflection coating on the first region and the second region.

The mold has a first region forming surface contoured to form the first region of the substrate to be molded, and a second region forming surface contoured to form the second region of the substrate to be molded.

A surface roughness of the second region forming surface is greater than a surface roughness of the first region forming surface.

According to a third aspect, there is provided an optical reflecting mirror comprising a substrate having a first surface, and a second surface connecting to the first surface at an angle made with the first surface.

The first surface has a first region, and a second region adjoining the first region and extending between the first region and at least one edge of the first surface.

The substrate is made of plastic, and a reflection coating is formed on the first region and the second region.

A surface roughness of the second region of the substrate is greater than a surface roughness of the first region of the substrate.

These and other aspects will become apparent from the following description taken in conjunction with the accompanying drawings.

DETAILED DESCRIPTION

Figure 1:
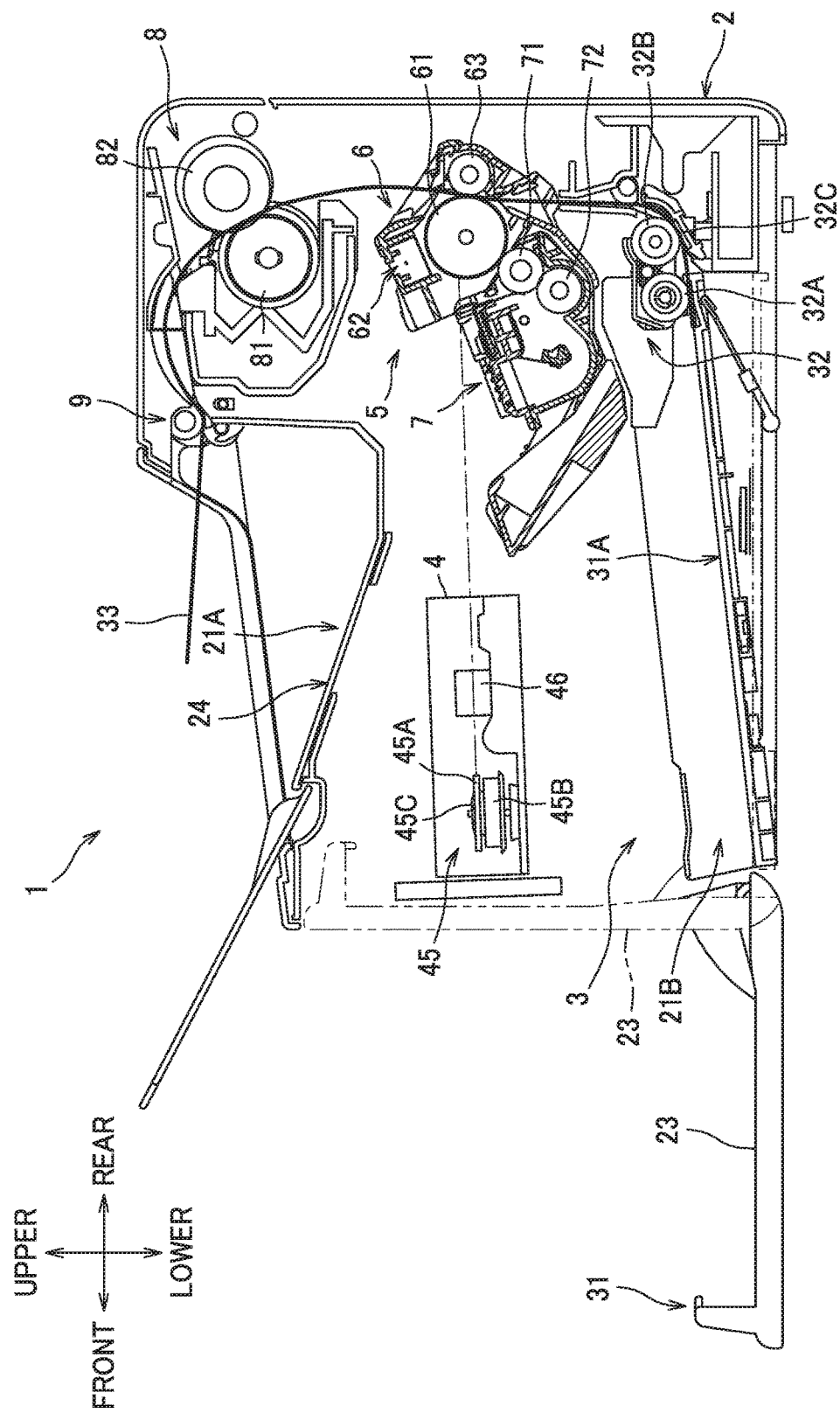
FIG. 1 is a sectional view showing the structure of an image forming apparatus according to an illustrative example.

A detailed description will be given of an illustrative example with reference to the accompanying drawings. In the following description, the direction is designated such that in FIG. 1, the left-hand side of the drawing sheet corresponds to the "front" side, the right-hand side of the drawing sheet corresponds to the "rear" side, the front side of the drawing sheet corresponds to the "right" side, the back side of the drawing sheet corresponds to the "left" side. Similarly, the upper/lower or top/bottom sides (upward/downward directions) of the drawing sheet correspond to the "upper-lower, top-bottom sides" or "vertical" direction.

As seen in FIG. 1, a laser printer 1 as an example of an image forming apparatus mainly includes a main body casing 2, a feeder unit 3, an optical scanner 4, a process cartridge 5, and a fixing device 8.

The main body casing 2 is provided with a front cover 23 pivotally supported by the main body casing 2. When the front cover 23 is swung forward into a lying back position to open an insertion slot 21B, a stack of sheets 33 can be inserted into the main body casing 2 through the insertion slot 21B.

The feeder unit 3 is located in a lower portion of the main body casing 2. The feeder unit 3 mainly includes a sheet feed tray 31 for receiving sheets 33, and a sheet feed mechanism 32 for feeding a sheet 33 from the sheet feed tray 31.

The sheet feed tray 31 includes a sheet receiving plate 31A disposed at the lower portion of the main body casing 2 and the above-described front cover 23. The sheet feed mechanism 32 mainly includes a sheet feed roller 32A, a separation roller 32B, and a separation pad 32C.

In the feeder unit 3, the sheet feed roller 32A feeds sheets 33 from the stack of sheets 33 placed on the sheet feed tray 31, and the sheets 33 are separated one from the others when passing through between the separation roller 32B and the separation pad 32C and fed to the process cartridge 5.

The optical scanner 4 is located in a front portion of the main body casing 2 and configured to scan the surface of a photoconductor drum 61 to be described later with a light beam. Details of the optical scanner 4 will be described later.

The process cartridge 5 is located in a rear portion of the main body casing 2 at a position around a center portion and above the sheet feed mechanism 32. The process cartridge 5 is detachably attached to the main body casing 2. When a top cover 24 pivotally supported by the main body casing 2 is swung open to expose an opening 21A, the process cartridge 5 is detachable from and installable into the main body casing 2 through the opening 21A in a diagonally upward and frontward direction. The process cartridge 5 includes a drum unit 6, and a development cartridge 7.

The drum unit 6 includes a photoconductor drum 61 as an example of a photoconductor, a charger 62, and a transfer roller 63. The development cartridge 7 includes a development roller 71 and a supply roller 72.

In the development cartridge 7, toner stored in a toner storage chamber is supplied to the development roller 71 by the supply roller 72, during which the toner is frictionally charged and carried on the development roller 71. In the drum unit 6, the surface of the rotating photoconductor drum 61 is uniformly charged by the charger 62 and then exposed to a rapidly sweeping light beam emitted from the optical scanner 4. Accordingly, an electric latent image associated with image data is formed on the surface of the photoconductor drum 61.

The toner in the development cartridge 7 is then supplied to the electric latent image, so that a toner image is formed on the surface of the photoconductor drum 61. Thereafter, while a sheet 33 is conveyed through between the photoconductor drum 61 and the transfer roller 63, the toner image carried on the surface of the photoconductor drum 61 is transferred onto the sheet 33.

The fixing device 8 is located in a rear upper portion of the main body casing 2 at a position above the process cartridge 5. The fixing device 8 mainly includes a heating roller 81 and a pressure roller 82.

In the fixing device 8 configured as described above, the toner transferred onto the sheet 33 is thermally fixed while the sheet 33 passes through between the heating roller 81 and the pressure roller 82. The sheet 33 with the toner thermally fixed thereon by the fixing device 8 is conveyed to a sheet ejection roller 9 which is disposed downstream of the fixing device 8, and then ejected out from the sheet ejection roller 9 onto the top cover 24.

Figure 2:
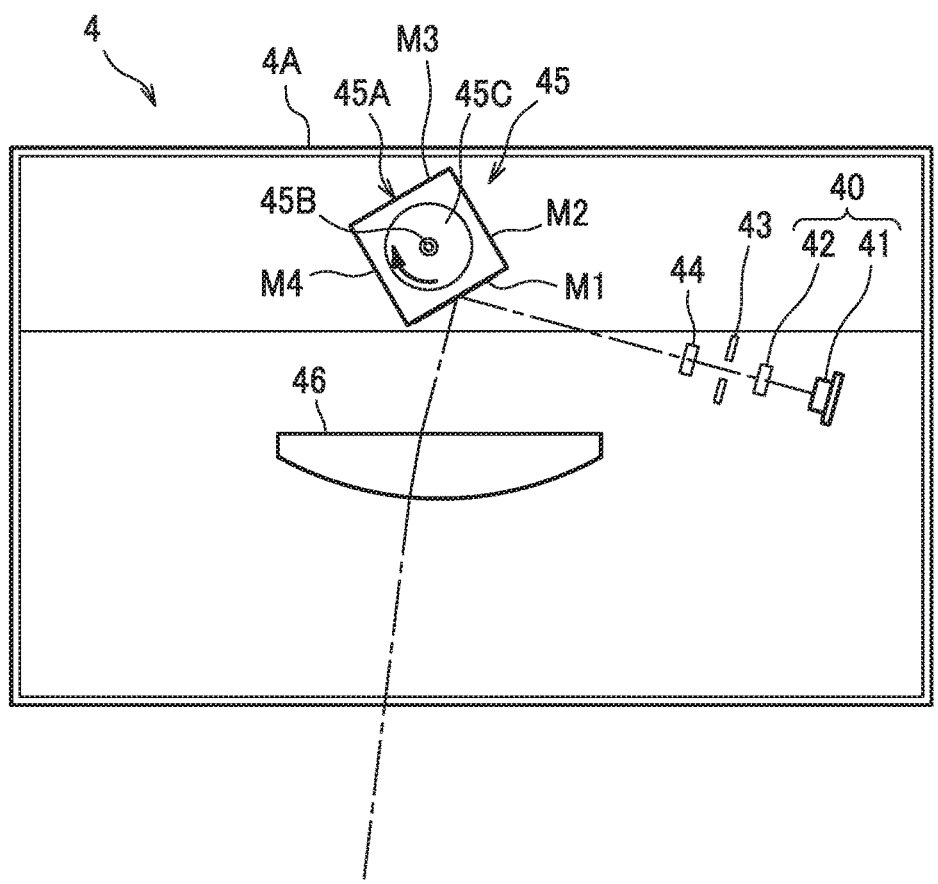
FIG. 2 is a top view of an optical scanner.

As seen in FIGS. 1 and 2, the optical scanner 4 mainly includes a semiconductor laser 41, a coupling lens 42, an aperture stop 43, a cylindrical lens 44, a light deflector 45, and a scanning lens 46. A light source portion 40 including the semiconductor laser 41 and the coupling lens 42 is an example of a light source configured to emit a light beam. These constituent elements are supported on a casing 4A. As shown by the alternate long and short dash lines in the figures, a laser beam emitted from the semiconductor laser 41 passes through the coupling lens 42, the aperture stop 43, and the cylindrical lens 44 in this order, and then, after being deflected in the main scanning direction by the light deflector 45, passes through the scanning lens 46 and focuses on the surface of the photoconductor drum 61.

As seen in FIG. 2, the semiconductor laser 41 is a device configured to emit diverging laser light. Light emitting elements of the semiconductor laser 41 are caused to blink by a controller (not shown) in accordance with image to be formed with light on the surface of the photoconductor drum 61. The coupling lens 42 is a lens configured to convert laser light emitted from the semiconductor laser 41 into a light beam.

The aperture stop 43 defines the diameter of the light beam. The cylindrical lens 44 is a lens configured to bring the light beam having passed through the aperture stop 43 into focus on a polygon mirror 45A in the sub-scanning direction (i.e., direction orthogonal to the drawing sheet of FIG. 2).

As seen in FIG. 1, the light deflector 45 includes a polygon mirror 45A configured to deflect the light beam having passed through the cylindrical lens 44 in the main scanning direction, a motor 45B configured to rotate the polygon mirror 45A, and a pressing member 45C configured to attach the polygon mirror 45A to the motor 45B. Details of the polygon mirror 45A will be described later.

As seen in FIG. 2, the scanning lens 46 is a lens configured to bring the light beam having been reflected and thus deflected by the polygon mirror 45A into focus on the surface of the photoconductor drum 61 as an image plane. The scanning lens 46 has f-theta characteristics such that the light beam deflected at a constant angular velocity by the polygon mirror 45A is converted into a light beam that scans the surface of the photoconductor drum 61 at a constant linear velocity.

Next, details of the polygon mirror 45A will be described below.

Figure 3A:
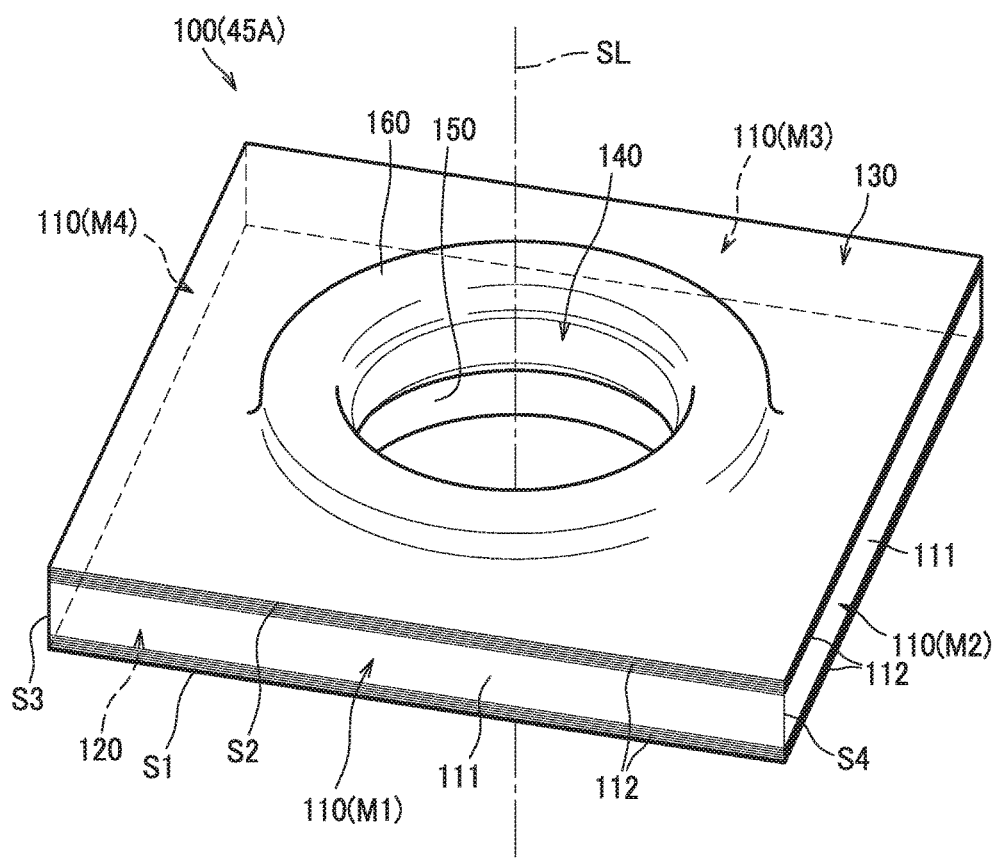
FIG. 3A is a perspective view of a polygon mirror.
Figure 3B:
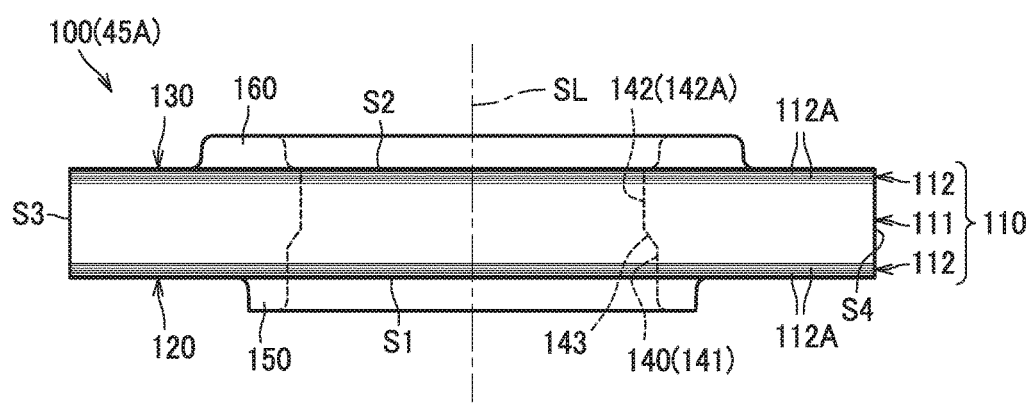
FIG. 3B is a side view of the polygon mirror.

As seen in FIGS. 3A and 3B, the polygon mirror 45A has four mirror surfaces M1-M4 disposed to surround an axis of rotation SL. The polygon mirror mainly includes a substrate 100 made of plastic, a reflection coating RC formed on part of the surfaces of the substrate 100 (see FIG. 4). It is to be understood that the axis of rotation SL coincides with the axis of rotation of the motor 45B to which the polygon mirror 45A is attached.

The substrate 100 is made of plastic such as cyclic olefin based plastic. The substrate 100 is in the shape of a square prism with generally square base surfaces, and mainly has four side surfaces 110 corresponding to the mirror surfaces M1-M4, a first base surface 120 (specifically, a lower surface) connecting to the four side surfaces 110 at one (lower) side, and a second base surface 130 (specifically, an upper surface) connecting to the four side surfaces 110 at the other (upper) side opposite to the lower side. The first base surface 120 and the second base surface 130 face away from each other. In the polygon mirror 45A, the reflection coating RC is formed on each of the side surfaces 110 so that the surfaces of the reflection coating RC provide the mirror surfaces M1-M4.

Each side surface 110 has a generally rectangular shape having two long edges S1, S2 extending in the right-left direction (lateral direction) of FIG. 3B, and two short edges S3, S4 extending to connect ends of the two long edges S1, S2. The long edge S1 is an edge of the side surface 110 along which the side surface 110 connects to the first base surface 120. The long edge S2 is an edge of the side surface 110 along which the side surface 110 connects to the second base surface 130. The short edges S3, S4 are edges of one side surface 110 along which the one side surface 110 connects to adjoining side surfaces 110.

Each side surface 110 has a first region 111 and a second region 112.

The first region 111 is a belt-like region extending in the direction where the long edges S1, S2 extend. The first region 111 is formed in a position substantially at the center of the side surface 110 in the vertical direction and includes the center of the side surface 110. In other words, the first region 111 is formed in an area of the side surface 110 other than an upper edge portion and a lower edge portion of the side surface 110.

The second region 112 is a belt-like region extending in the direction where the long edges S1, S2 extend; the second region 112 is formed on each of the upper edge portion and the lower edge portion of the side surface 110, and adjoins the first region 111. To be more specific, the second region 112 extends on each side of the first region 111 entirely along the long edge S1 and the long edge S2.

Figure 4:
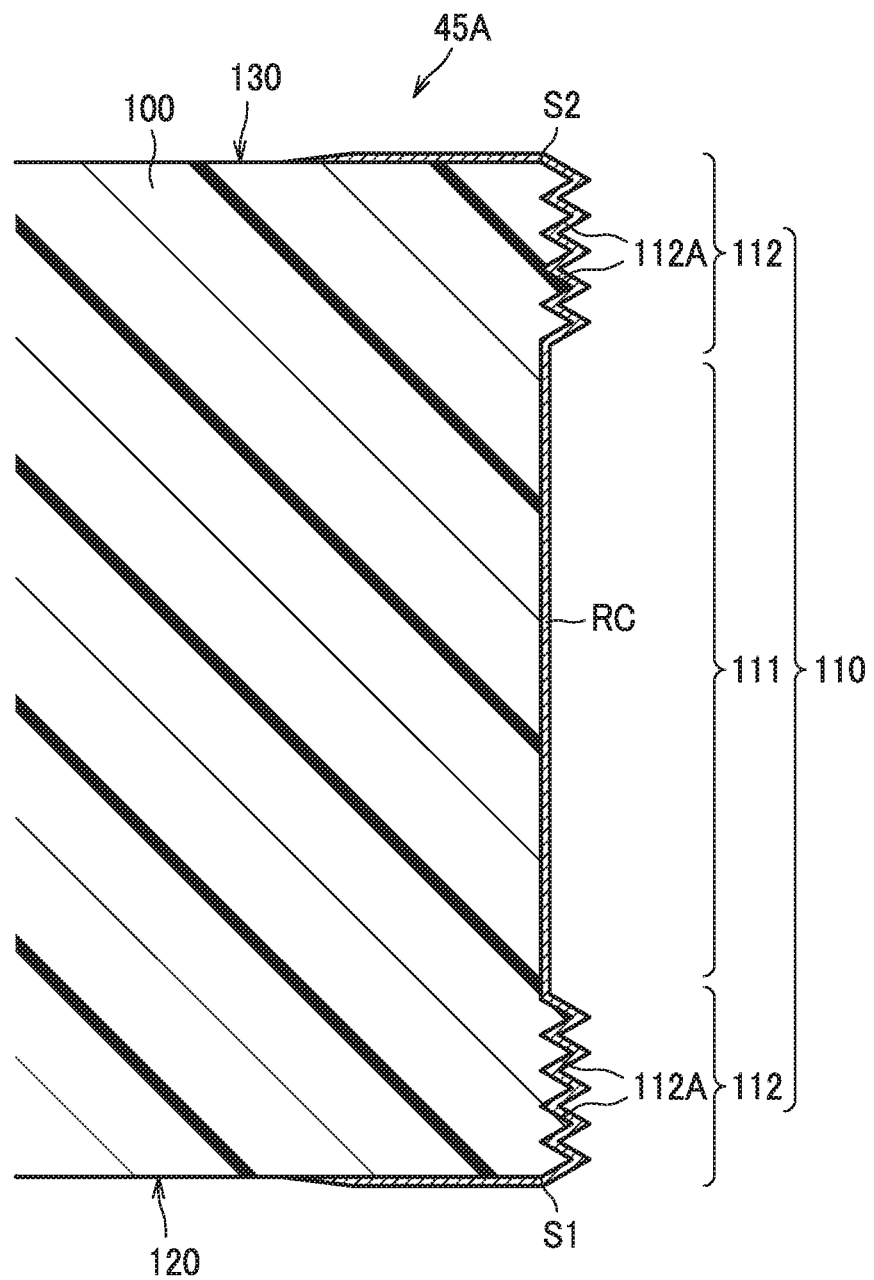
FIG. 4 is a sectional view showing an end portion of the polygon mirror.

As seen in FIGS. 3B and 4, a plurality of grooves 112A extending entirely along the long edges S1, S2 are formed one above another at each second region 112. Owing to these grooves 112A, the surface roughness of the second region 112 is greater than the surface roughness of the first region 111. To facilitate understanding of the disclosure, the reflection coating RC and the grooves 112A are illustrated in a manner exaggerated in size, pitch and thickness, in the drawings to be referred to.

It is preferable that the surface roughness of the second region 112 is five times as great as that of the first region 111 or greater, and more preferably ten times as great as that of the first region 111 or greater. As an example, the surface roughness of the first region 111 is equal to or less than Ra 0.1 µm. In contrast, it is preferable that the surface roughness of the second region 112 is equal to or greater than Ra 0.5 µm, and more preferably equal to or greater than Ra 1.0 µm. Further, the surface roughness of the second region 112 is preferably equal to or less than Ra 50 µm. It is to be noted that Ra corresponds to the arithmetic average roughness defined by JIS B0601-2001. The surface roughness can be measured, for example, using an interferometry-type 3D optical surface profiler such as Talysurf® CCI manufactured by TAYLOR HOBSON Ltd.

As seen in FIG. 4, the reflection coating RC is formed on the entire surface of the side surface 110 so as to cover the entire surfaces of the first region 111 and the second region 112. In this illustrative example, the reflection coating RC is contiguously formed from the side surface 110 to the first base surface 120 and to the second base surface 130. To be more specific, the reflection coating RC is not formed on the entire surfaces of the first base surface 120 and the second base surface 130 but on outer peripheral regions of the first base surface 120 and the second base surface 130 only. Herein, the outer peripheral region indicates a region of the first base surface 120 or the second base surface 130 that extends from a position radially apart from the axis of rotation SL (see FIG. 3) to the peripheral edge of the first base surface 120 or the second base surface 130.

The reflection coating RC is made of a material consisting essentially of aluminum. To be more specific, the material of the reflection coating RC may be Al, Al-2% Si, Al—Nd, and Al—Cu—Si for instance. The thickness of the reflection coating RC may be set, as an example, at a value from 45 nm to 105 nm.

The polygon mirror 45A may optionally have an additional coating, such as a protection coating for protecting the reflection coating RC, on the surfaces of the reflection coating RC. For example, provision of a protection coating on the surfaces of the reflection coating RC makes it possible to suppress oxidization of the reflection coating RC and to prevent the reflection coating RC from being scratched.

As seen in FIGS. 3A and 3B, the substrate 100 has a through-hole 140, a first protruding portion 150, and a second protruding portion 160.

The through-hole 140 is a hole in which the rotary shaft of the motor 45B is to be inserted. The through-hole 140 is formed in the center of the substrate 100 so as to pierce through the first base surface 120 and the second base surface 130 in the vertical direction. An inner peripheral surface 141 of the through-hole 140 is a circular cylindrical surface, and an annular rib 142 protruding radially inward from the inner peripheral surface 141 is formed integrally with the inner peripheral surface 141. Further, a slanted portion 143 for smoothly connecting an inner surface 142A of the rib 142 and the inner peripheral surface 141 is formed integrally under the rib 142. The slanted portion 143 extends from the inner surface 142A of the rib 142 to the inner peripheral surface 141 and has a slanted surface slanting relative to the axis of rotation SL.

The first protruding portion 150 has an annular shape extending around the axis of rotation SL, and protrudes downward from the first base surface 120 along the axis of rotation SL. The first protruding portion 150 is formed around the through-hole 140 (to surround the periphery (peripheral edge) of the through-hole 140).

The second protruding portion 160 has an annular shape extending around the axis of rotation SL, and protrudes upward from the second base surface 130 along the axis of rotation SL. The second protruding portion 160 is formed around the through-hole 140.

Next, a method for manufacturing the polygon mirror 45A will be described.

Figure 5:
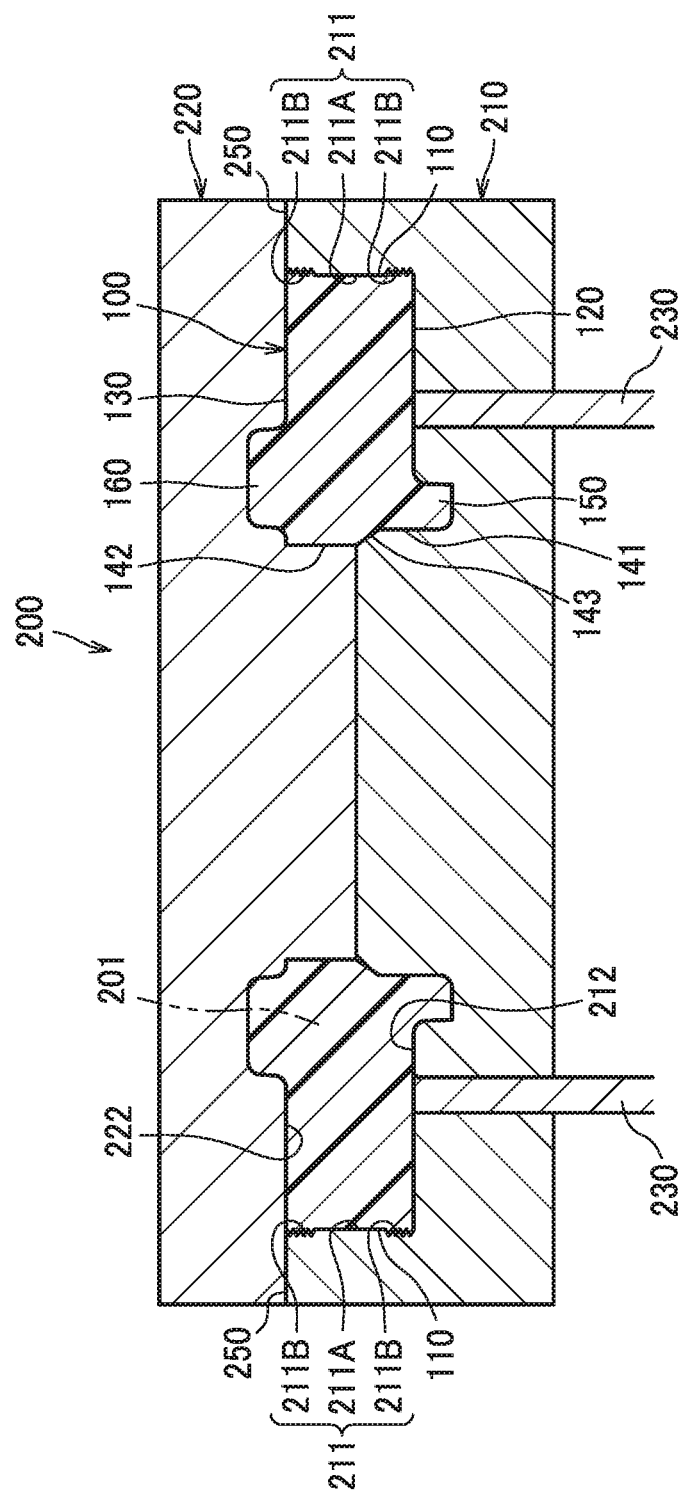
FIG. 5 is a view showing the structure of a mold for explaining a process of forming a substrate.

According to the method for manufacturing the polygon mirror 45A in this illustrative example, a mold 200 such as shown in FIG. 5 and a sputtering apparatus 300 such as shown in FIG. 6 are used. In the following description, structures of the mold 200 and the sputtering apparatus 300 will be briefly described first. The mold 200 used herein is a metal mold typically made of alloy steel.

As seen in FIG. 5, the mold 200 has a cavity 201 contoured to form a shape of the substrate 100 for the polygon mirror 45A. As an example, the mold 200 mainly includes a stationary mold plate 210 and a movable mold plate 220.

The stationary mold plate 210 mainly includes four side surface forming surfaces 211 configured to form the four side surfaces 110, and a first base surface forming surface 212 configured to form the first base surface 120, the first protruding portion 150, and the inner peripheral surface 141 and the slanted portion 143 of the through-hole 140. Further, the stationary mold plate 210 is provided with a plurality of ejector pins 230.

Each of the side surface forming surfaces 211 has a first region forming surface 211A configured to form the first region 111 of the side surface 110, and a second region forming surface 211B configured to form the second region 112 of the side surface 110. A plurality of protrusions (reference numeral omitted) configured to form the grooves 112A are formed on the second region forming surface 211B, for example, by grinding. With this configuration, the surface roughness of the second region forming surface 211B is greater than the surface roughness of the first region forming surface 211A.

The movable mold plate 220 mainly includes a second base surface forming surface 222 configured to form the second base surface 130, the second protruding portion 160, and the rib 142 of the through-hole 140. The second base surface forming surface 222, together with the side surface forming surfaces 211 and the first base surface forming surface 212 of the stationary mold plate 210, forms the cavity 201. Although not shown in the drawings, the movable mold plate 220 has gates through which molten plastic is injected into the cavity 201 to form a substrate 100.

Figure 6A:
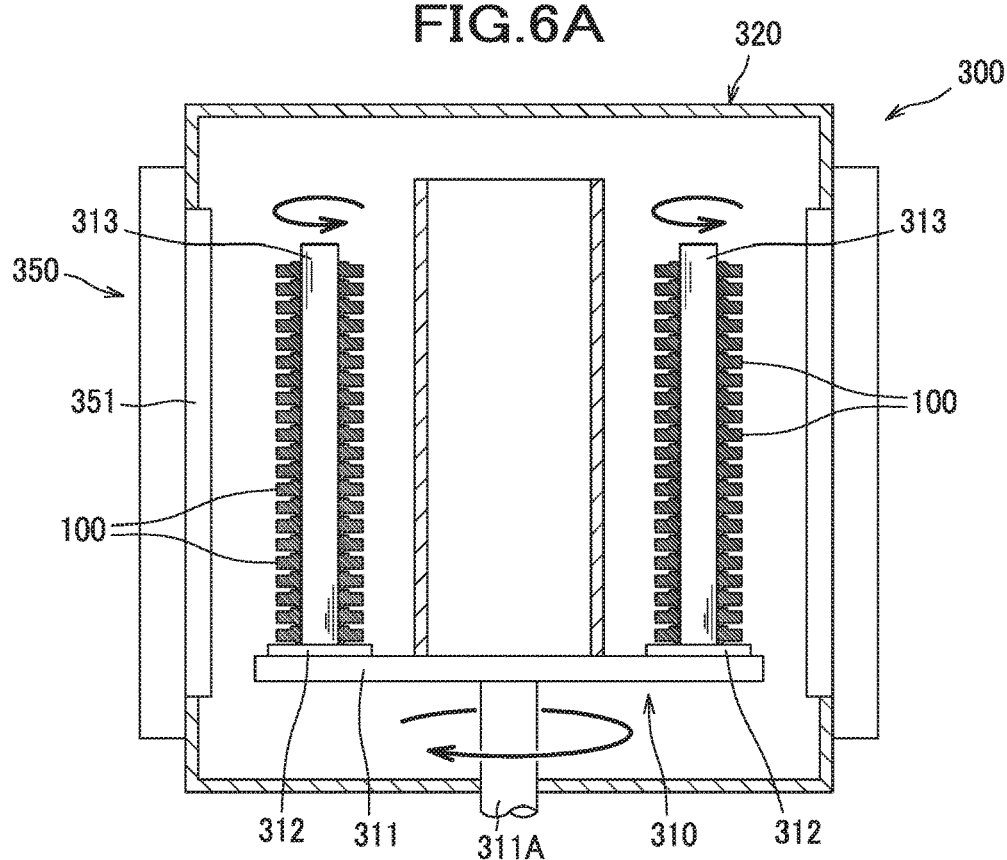
FIGS. 6A and 6B are views showing the structure of a sputtering apparatus and a process of forming a reflection coating on the substrate.
Figure 6B:
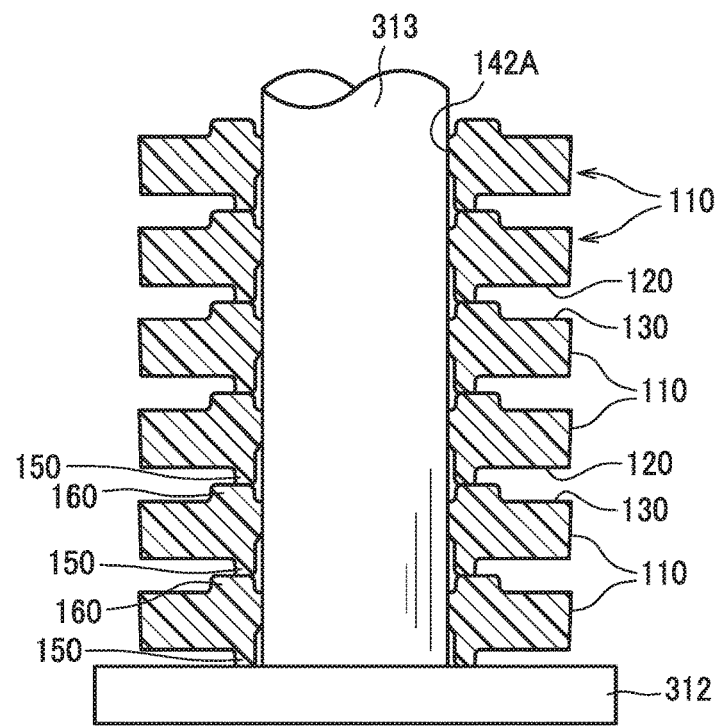

As seen in FIGS. 6A and 6B, the sputtering apparatus 300 mainly includes a rotation/revolution device 310, a vacuum chamber 320, and a reflection coating forming device 350.

The rotation/revolution device 310 is configured to cause a plurality of substrates 100 to rotate and revolve. The rotation/revolution device 310 includes a revolution stage 311, a plurality of rotation stages 312 rotatably supported on the revolution stage 311, and a plurality of supporting shafts 313 each fixed to the center of each of the rotation stages 312.

The revolution stage 311 is configured to rotate around a rotary shaft 311A by a driving source (not shown) and a driving mechanism (not shown). The rotation stage 312 is a stage configured to support a plurality of substrates 100, and is rotatable around the axis of rotation of the supporting shaft 313 by a driving source (not shown) and a driving mechanism (not shown). The supporting shaft 313 is a rod-like member configured to support a plurality of substrates 100.

The vacuum chamber 320 is shaped to have a hollow circular cylinder. The vacuum chamber 320 stores therein the rotation/revolution device 310, and is provided at its side wall with the reflection coating forming device 350.

The reflection coating forming device 350 is configured to form a reflection coating RC on side surfaces 110 of each of the plurality of substrates 100.

The polygon mirror 45A is manufactured using a mold 200 shown in FIG. 5. When manufacturing the polygon mirror 45A, a mold preparation step for preparing the mold 200 is carried out first. To be more specific, a stationary mold plate 210 and a movable mold plate 220 are clamped together in the mold preparation step to form a cavity 201.

In this step, one or more vents (e.g., a vent, an air vent, vents or air vents) 250 are formed between the stationary mold plate 210 and the movable mold plate 220. The vent 250 is a shallow gap or opening sized in the range of 0.01 to 0.02 mm to allow air in the cavity 201 or gases generated from plastic to escape from the cavity 201. The vents 250 are located in positions corresponding to the outer edge of the second region 112 of the side surface 110.

Next, a substrate formation step for forming a substrate 100 is carried out by injecting melted plastic into the cavity 201 through gates (not shown). In this step, air in the cavity 201 or gases generated from the plastic are forced out through the vents 250, while the injected plastic does not pass through the vent(s) 250. Thereafter, once the plastic is solidified, a separation step for separating the stationary mold plate 210 and the movable mold plate 220 from each other is carried out. After that, a demolding step for demolding the substrate 100 from the stationary mold plate 210 is carried out by pushing the substrate 100 that is a molded product at the first base surface 120 thereof using a plurality of ejector pins 230 to release the substrate 100 from the stationary mold plate 210.

It should be noted that the surface roughness of the second region forming surfaces 211B of the mold 200 is greater than the surface roughness of the first region forming surfaces 211A, so that the substrate 100 molded in the substrate formation step has a greater surface roughness at the second region 112 of the side surface 110 than at the first region 111 of the side surface 110.

Subsequently, a coating step for forming a reflection coating RC on the side surfaces 110 (to be more specific, on the surfaces of the first region 111 and the second region 112) of the substrate 100 is carried out. As an example, as seen in FIGS. 6A and 6B, a plurality of substrates 100 are stacked one on another on the rotation stages 312 by inserting the through-hole 140 of each of the substrates 100 onto the supporting shaft 313 of each rotation stage 312.

In this step, the first protruding portion 150 of the substrate 100 is supported on the second protruding portion 160 of another substrate 100 that has been stacked previously and disposed under the substrate 100 or on the rotation stage 312, so that a gap is formed between the side surfaces 110 of the two adjacent substrates 100 or between the side surfaces 110 of the lowermost substrate 100 and the rotation stage 312. Therefore, a space is formed above and below the side surfaces 110 of each of the substrates 100.

After that, a vacuum is produced in the vacuum chamber 320 and then an inert gas such as argon gas is introduced into the vacuum chamber 320. Next, when the reflection coating forming device 350 is actuated, aluminum atoms are ejected from a target 351 made of aluminum toward the side surfaces 110 of the substrates 100 to perform sputtering on the substrates 100. Accordingly, the reflection coating RC consisting mainly of aluminum is formed on the side surfaces 110 of each of the substrates 100.

In the sputtering process, because of a space being formed above and below the side surfaces 110, when aluminum atoms are ejected toward the side surfaces 110 and run around the first base surface 120 and the second base surface 130 from the side surfaces 110, as seen in FIG. 4, the aluminum atoms are deposited also on the first base surface 120 and the second base surface 130. Accordingly, the reflection coating RC is contiguously formed throughout an outer peripheral region of the first base surface 120, the side surfaces 110, and an outer peripheral region of the second base surface 130.

By the above-described manufacturing process, a polygon mirror 45A is manufactured.

According to the above illustrative example, since the surface roughness of the second region 112 is greater than that of the first region 111, the second region 112 can provide a larger surface area as compared with an alternative configuration in which the surface roughness of the second region 112 is the same as that of the first region 111. This allows light to be excellently reflected by the reflection coating RC that is formed on the first region 111 having a smaller surface roughness, while the adhesion between the substrate 100 and the reflection coating RC can be improved at the second region 112 with the help of its increased surface area.

Further, according to the above illustrative example, since the second region 112 is provided along both the long edge S1 and the long edge S2 of each of the side surfaces 110, the surface distance (i.e., length of undulated path) from the edge of the side surface 110 adjoining the first base surface 120 (i.e., long edge S1) to the first region 111 and the surface distance from the edge of the side surface 110 adjoining the second base surface 130 (i.e., long edge S2) to the first region 111 can be extended. With this configuration, even if the reflection coating RC deteriorates due to moisture in the air entering between the reflection coating RC and the substrate 100 from the edge of the reflection coating RC for instance, and the reflection coating RC starts to peel off from the edge on the first base surface 120 or from the edge on the second base surface 130, peeling of the reflection coating RC is less likely to reach the first region 111 of the side surface 110. Accordingly, since peeling of the reflection coating RC on the first region 111 can be suppressed, the service life of the polygon mirror 45A can be extended.

Further, according to the above illustrative example, the reflection coating 110 is contiguously formed from the side surfaces 110 to the first base surface 120 and to the second base surface 130, so that peeling of the reflection coating RC from the edge of the side surface 110 adjoining the first base surface 120 and from the edge of the side surface 110 adjoining the second base surface 130 can be more reliably suppressed.

Further, according to the above illustrative example, the second region 112 has grooves 112A extending entirely along the long edges S1, S2, so that the surface distance from the upper and lower edges of the side surface 110 to the first region 111 can be extended. Further, due to the fact that the grooves 112A extending entirely along an edge of the side surface 110 are formed in the second region 112, it is possible to fairly prevent moisture in the air from entering between the reflection coating RC and the first region 111 from the direction orthogonal to the grooves 112A.

In the above illustrative example, the surface roughness of the first region 111 is equal to or less than Ra 0.1 μm, so that light can be excellently reflected by the reflection coating RC formed on the first region 111.

Further, in the above illustrative example, the surface roughness of the second region 112 is in the range of Ra 0.5 μm to Ra 50 μm, so that the substrate 100 can be formed using a mold such as the mold 200.

Although an illustrative example of the disclosure has been described in detail, the present invention is not limited to this specific example. It is to be understood that various changes and modifications, such as those described below, may be made without departing from the scope of the appended claims.

Figure 7A:
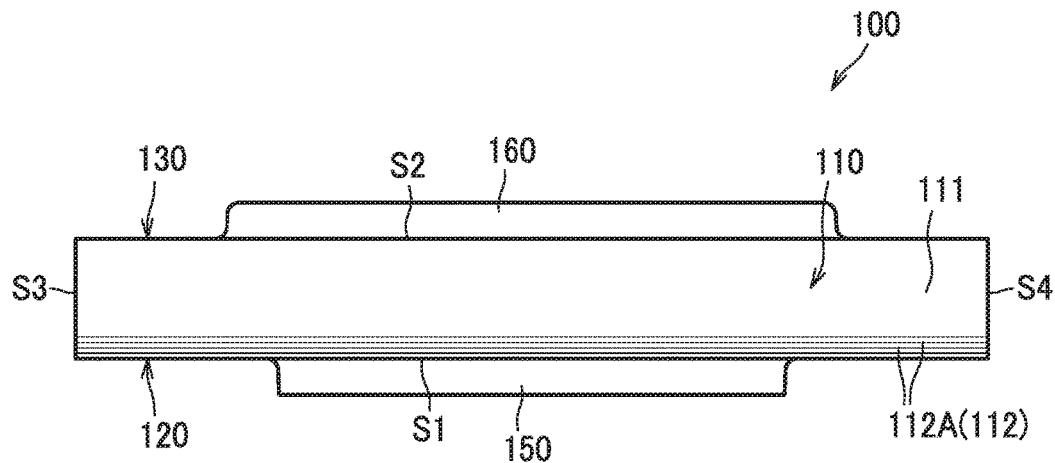
FIG. 7A is a side view of a substrate according to a first modification.

In the above illustrative example, the second region 112 is provided on each side of the first region 111 entirely along the long edge S1 and the long edge S2. However, the present invention is not limited to this specific configuration. For example, as seen in FIG. 7A, the second region 112 may be provided entirely along one of the long edge S1 and the long edge S2; to be more specific, the second region 112 may be provided only on the lower edge of the first region 111 adjoining the first region 111 and extending between the first region 111 and the long edge S1. With this configuration, the surface distance from the edge of the side surface 110 adjoining the first base surface 120 to the first region 111 can be extended, so that even if the reflection coating RC starts to peel off from the edge on the first base surface 120, peeling of the reflection coating RC is less likely to reach the first region 111.

Figure 7B:
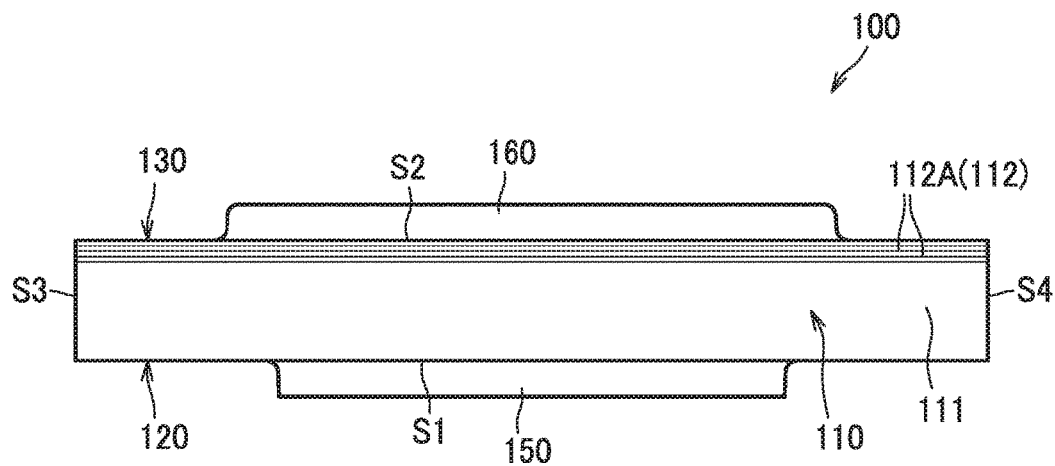
FIG. 7B is a side view of a substrate according to a second modification.

Alternatively, as seen in FIG. 7B, the second region 112 may be provided on the other one of the long edge S1 and the long edge S2; to be more specific, the second region 112 may be provided only on the upper edge of the first region 111 adjoining the first region 111 and extending between the first region 111 and the long edge S2. With this configuration, the surface distance from the edge of the side surface 110 adjoining the second base surface 130 to the first region 111 can be extended, so that even if the reflection coating RC starts to peel off from the edge on the second base surface 130, peeling of the reflection coating RC is less likely to reach the first region 111.

Figure 8:
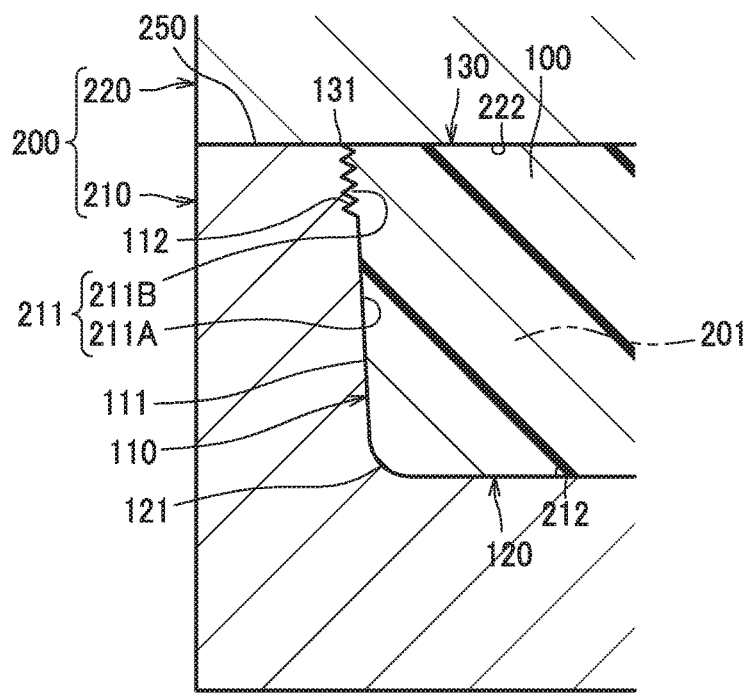
FIG. 8 is a sectional view showing a part of a mold for forming a substrate and a substrate formed, in which substrate the radius of curvature of a first connecting portion is greater than the radius of curvature of a second connecting portion, and a second region is formed along an edge of a side surface that connects to a second base surface of the substrate.

As seen in FIG. 8, in the mold 200 for forming a substrate 100, both of the side surface forming surfaces 211 and the first base surface forming surface 212 are formed in the stationary mold plate 210. Therefore, a connecting portion connecting a side surface forming surface 211 and the first base surface forming surface 212 is contoured to be circular in cross section that gently curves outward in the cavity 201. In contrast, a connecting portion connecting a side surface forming surface 211 and the second base surface forming surface 222 is formed as an angular shape having no curved surface because the side surface forming surface 211 and the second base surface forming surface 222 are formed separately in the stationary mold plate 210 and the movable mold plate 220, respectively.

For this reason, the substrate 100 formed has a greater radius of curvature at a first connecting portion 121 connecting the side surface 110 and the first base surface 120 than at a second connecting portion 131 connecting the side surface 110 and the second base surface 130. To be more specific, the substrate 100 has a round shape at the first connecting portion 121 and an angular shape at the second connecting portion 131. According to this configuration of the substrate 100, if a reflection coating is contiguously formed throughout an outer peripheral region of the first base surface 120, the side surfaces 110, and an outer peripheral region of the second base surface 130, the reflection coating will be thinner in the proximity of the second connecting portion 131 than the other portions. This may cause the reflection coating to peel off at or around the second connecting portion 131.

To address this concern, it is preferable that the second region 112 is provided at least along the edge of each side surface 110 that connects to the second base surface 130.

With this configuration, the surface distance from the proximity of the second connecting portion 131 to the first region 111 can be extended, so that even if the reflection coating starts to peel off from the proximity of the second connecting portion 131, peeling of the reflection coating is less likely to reach the first region 111.

Figure 9:
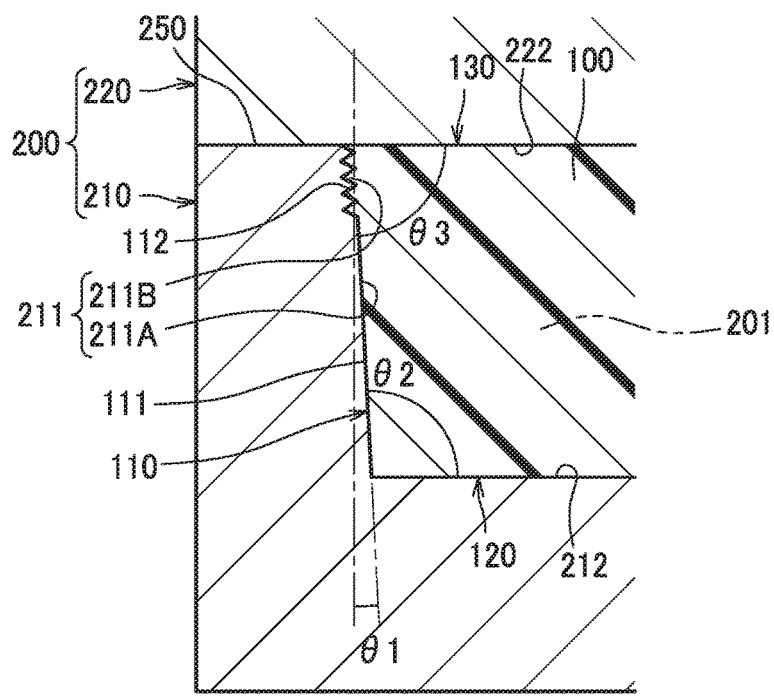
FIG. 9 is a sectional view showing a part of a mold for forming a substrate and a substrate formed, in which substrate the angle made by a side surface and a first base surface is greater than the angle made by the side surface and a second base surface, and a second region is formed along an edge of the side surface that connects to the second base surface of the substrate.

Further, as seen in FIG. 9, the mold 200 has a draft θ1 at the side surface forming surface 211. Therefore, the angle θ2 made by the side surface forming surface 211 and the first base surface forming surface 212 is greater than the angle θ3 made by the side surface forming surface 211 and the second base surface forming surface 222.

For this reason, in the substrate 100 formed, the angle θ2 made by the side surface 110 and the first base surface 120 is greater than the angle θ3 made by the side surface 110 and the second base surface 130. To be more specific, the substrate 100 is formed such that the angle θ2 made by the side surface 110 and the first base surface 120 is an obtuse angle, while the angle θ3 made by the side surface 110 and the second base surface 130 is an acute angle. According to this configuration of the substrate 100, as with the above, if a reflection coating is contiguously formed throughout an outer peripheral region of the first base surfaces 120, the side surfaces 110, and an outer peripheral region of the second base surface 130, the reflection coating will be thinner in the proximity of the connecting portion that connects the side surface 110 and the second base surface 130 than the other portions. This may cause the reflection coating to peel off at or around this connecting portion.

To address this concern, it is preferable that the second region 112 is provided at least along the edge of each side surface 110 that connects to the second base surface 130. With this configuration, the surface distance from the proximity of the connecting portion that connects the side surface 110 and the second base surface 130 to the first region 111 can be extended, so that even if the reflection coating starts to peel off from the proximity of this connecting portion, peeling of the reflection coating is less likely to reach the first region 111.

Figure 10A:
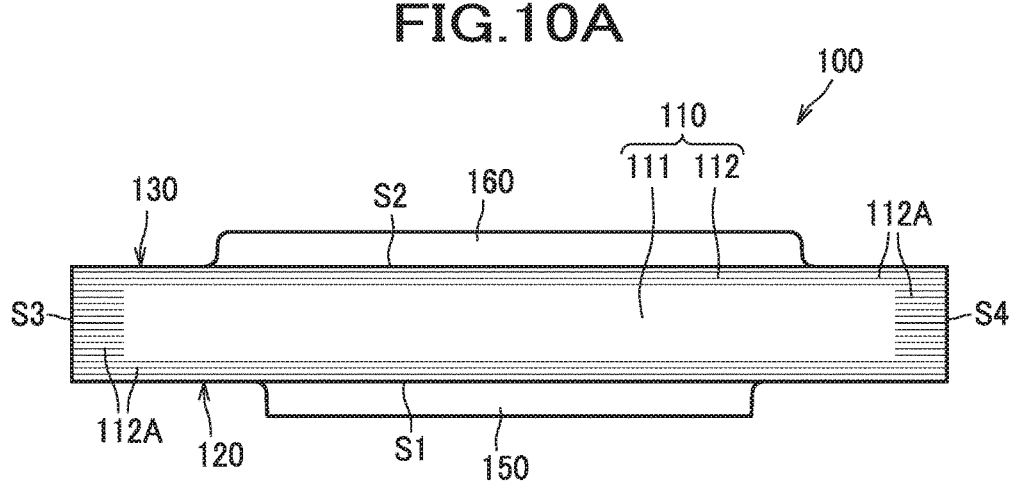
FIG. 10A is a side view of a substrate according to a third modification.

In the above illustrative example and modifications, the second region 112 is provided along the long edge S1, S2 (i.e., edge of the side surface 110 adjoining the first base surface 120 or the second base surface 130) only. However, the present invention is not limited to this specific configuration. For example, as seen in FIG. 10A, the second regions 112 may be provided along all of the long edges S1, S2 and the short edges S3, S4 (i.e., on each side of one side surface 110 that connects to an adjoining side surface 110).

It should be noted that the second region may be provided along at least one edge of each of the side surfaces of the substrate.

Figure 10B:
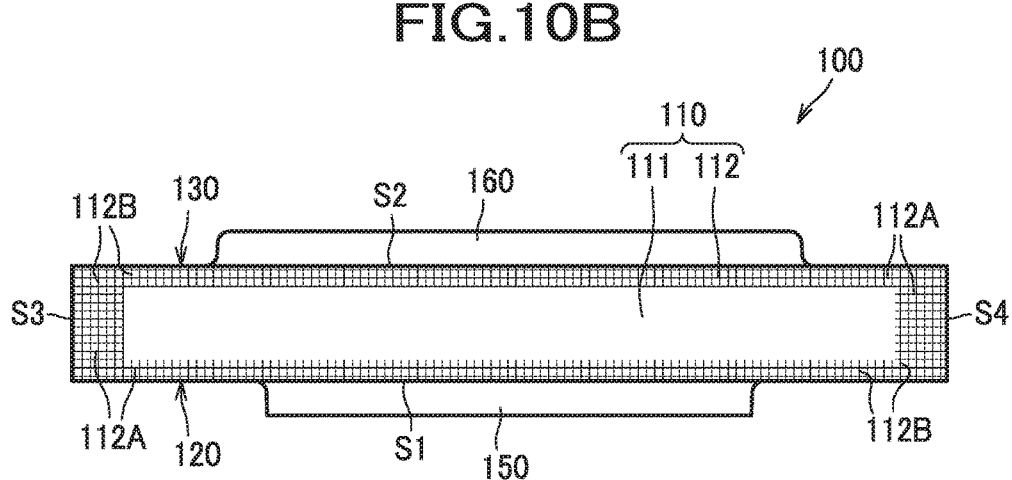
FIG. 10B is a side view of a substrate according to a fourth modification.
Figure 10C:
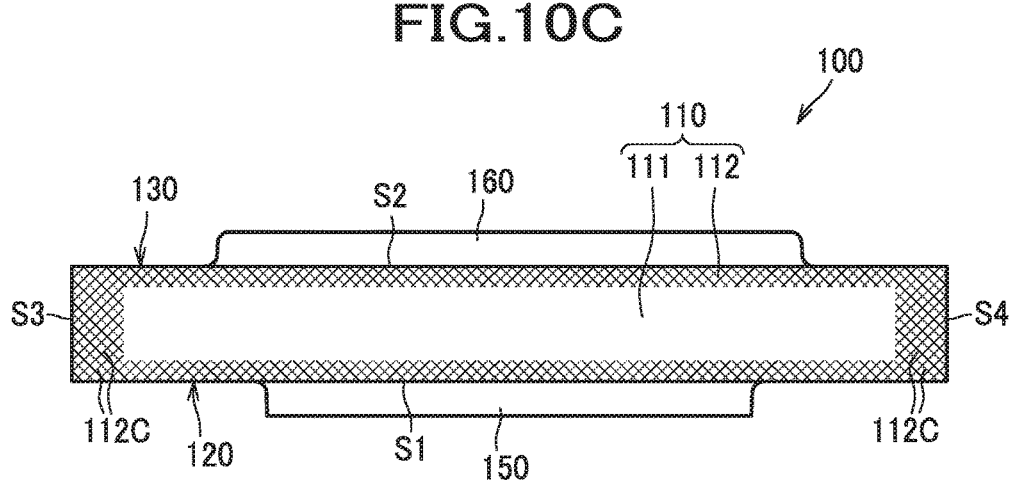
FIG. 10C is a side view of a substrate according to a fifth modification.

In the above illustrative example and modifications, the second region 112 has grooves 112A extending entirely along the long edges S1, S2. However, the present invention is not limited to this specific configuration. For example, the second region 112 may have only one groove 112A extending entirely along one or each of the long sides S1, S2. Further, as seen in FIG. 10B, the second region 112 may have grid-like grooves consisting of grooves 112A extending entirely along the long edges S1, S2 and grooves 112B extending entirely along the short edges S3, S4. Further, as seen in FIG. 10C, the side surface 110 may have second regions 112 having grid-like grooves 112C. The grid-like grooves 112C are grooves extending at a predetermined angle (e.g., 45°) with respect to the edges S1-S4, instead of extending substantially parallel to the long edges S1, S2 or the short edges S3, S4. The configuration such as shown in FIG. 10C can suppress diffracted light reaching the surface of the photoconductor drum 61. Further, although not shown in the drawings, the second region 112 may have grooves extending entirely along the short edges S3, S4 only.

In the above illustrative example, the surface roughness of the second region 112 is greater than the surface roughness of the first region 111 owing to the grooves 112A formed in the second region 112. However, the present invention is not limited to this specific configuration. For example, the side surface of the substrate may be made uneven with surface asperities other than the grooves, so as to make the surface roughness of the second region greater than the surface roughness of the first region.

In the above illustrative example, the reflection coating RC is contiguously formed throughout the outer peripheral region of the first base 120, the side surfaces 110, and the outer peripheral region of the second base surface 130. However, the present invention is not limited to this specific configuration. For example, the reflection coating may be formed on the entire surfaces of the substrate. As an alternative, the reflection coating may be formed on the side surfaces only.

In the above illustrative example, the substrate 100 for the polygon mirror 45A is shaped as a square prism having four side surfaces 110, and first and second base surfaces 120, 130 of a substantially square shape. However, as long as the substrate has a plurality of side surfaces, a first base surface connecting to the plurality of side surfaces, and a second base surface connecting to the plurality of side surfaces, and the first base surface and the second base surface face away from each other, the shape of the substrate is not limited to this specific shape. For example, the substrate may be shaped like a hexagonal prism or an octagonal prism.

In the above illustrative example, the reflection coating RC is formed on the surfaces of the substrate 100 by sputtering. However, the present invention is not limited to this specific configuration, and the reflection coating may be formed on the surfaces of the substrate by vapor deposition.

Figure 11:
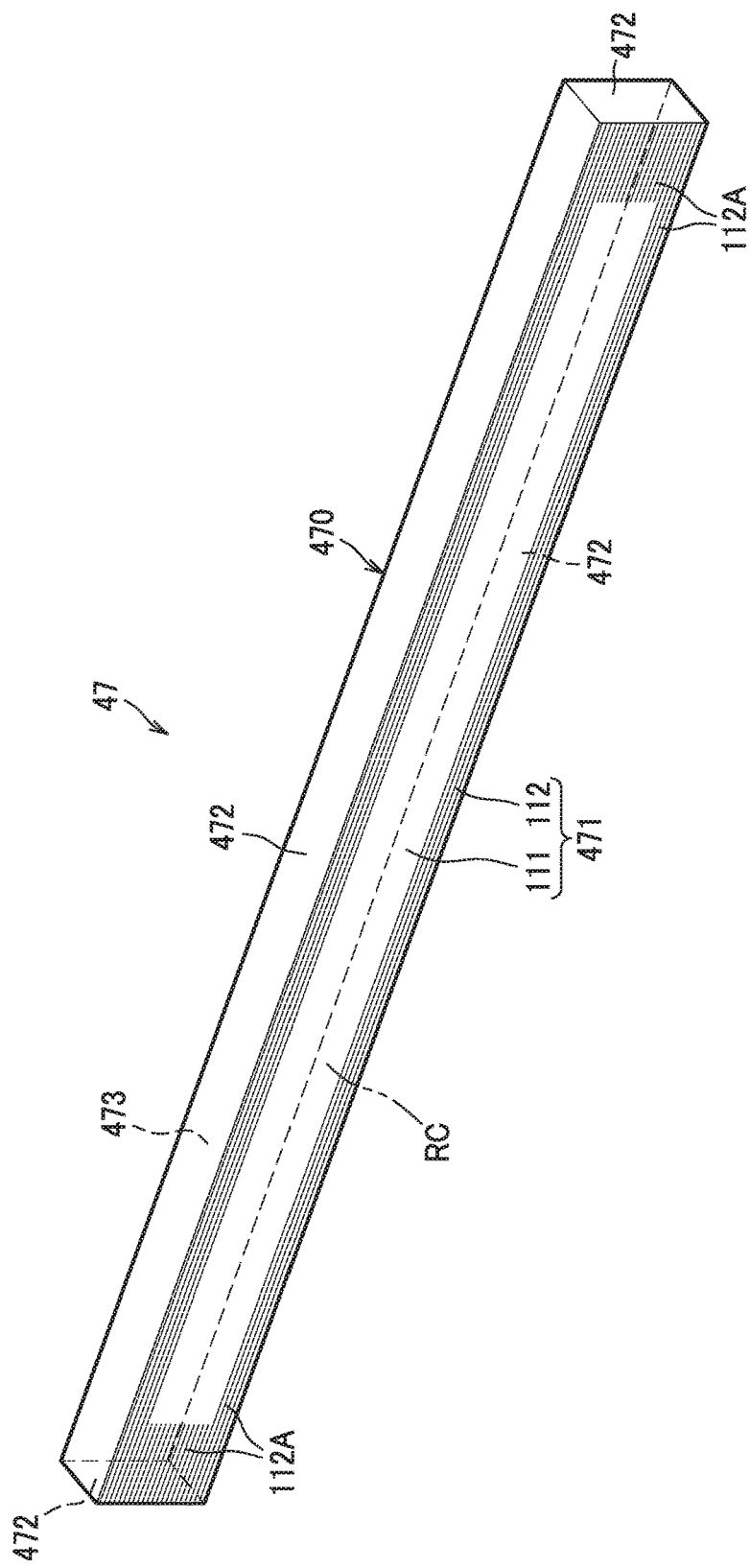
FIG. 11 is a perspective view of a reflecting mirror according to another illustrative example.

In the above illustrative example and modifications, the polygon mirror 45A has been described as an example to which the present invention is applied. However, the present invention is not limited to a polygon mirror and is applicable to an optical reflecting mirror other than the polygon mirror. For example, as seen in FIG. 11, the reflecting mirror 47 mainly includes a substrate 470 made of plastic, and a reflection coating RC formed on a part of the substrate 470.

The substrate 470 is in the shape of a thick plate extending in the right-left (lateral) direction in the drawing figure. The substrate 470 has a first surface 471, four second surfaces 472 connecting to the first surface 471 at an angle of substantially 90° with respect to the first surface 471, and a third surface 473 connecting to the second surfaces 472 at an angle of substantially 90° with respect to the second surfaces 472 and disposed on the opposite side (back side) of the first surface 471.

The first surface 471 is approximately rectangular in shape. The first surface 471 has a first region 111 and a second region 112.

The first region 111 is a belt-like region extending in the right-left direction in the drawing figure. The first region 471 is formed in the central portion of the first surface 471.

The second region 112 is a belt-like region extending to surround the first region 111. The second region 112 is provided along the four edges of the first surface 471, adjoining the first region 111. A plurality of grooves 112A extending in the longitudinal direction of the first surface 471 are formed one above another in the second region 112.

Owing to these grooves 112A, the surface roughness of the second region 112 is greater than the surface roughness of the first region 111.

The reflection coating RC is formed entirely on the first surface 471 so as to cover the entire surfaces of the first region 111 and the second region 112. It should be noted that the reflection coating RC may be contiguously formed from the first surface 471 to the second surfaces 472. Alternatively, the reflection coating RC may be formed on the entire surfaces of the substrate 470 or may be formed on the first surface 471 only.

Figure 12:
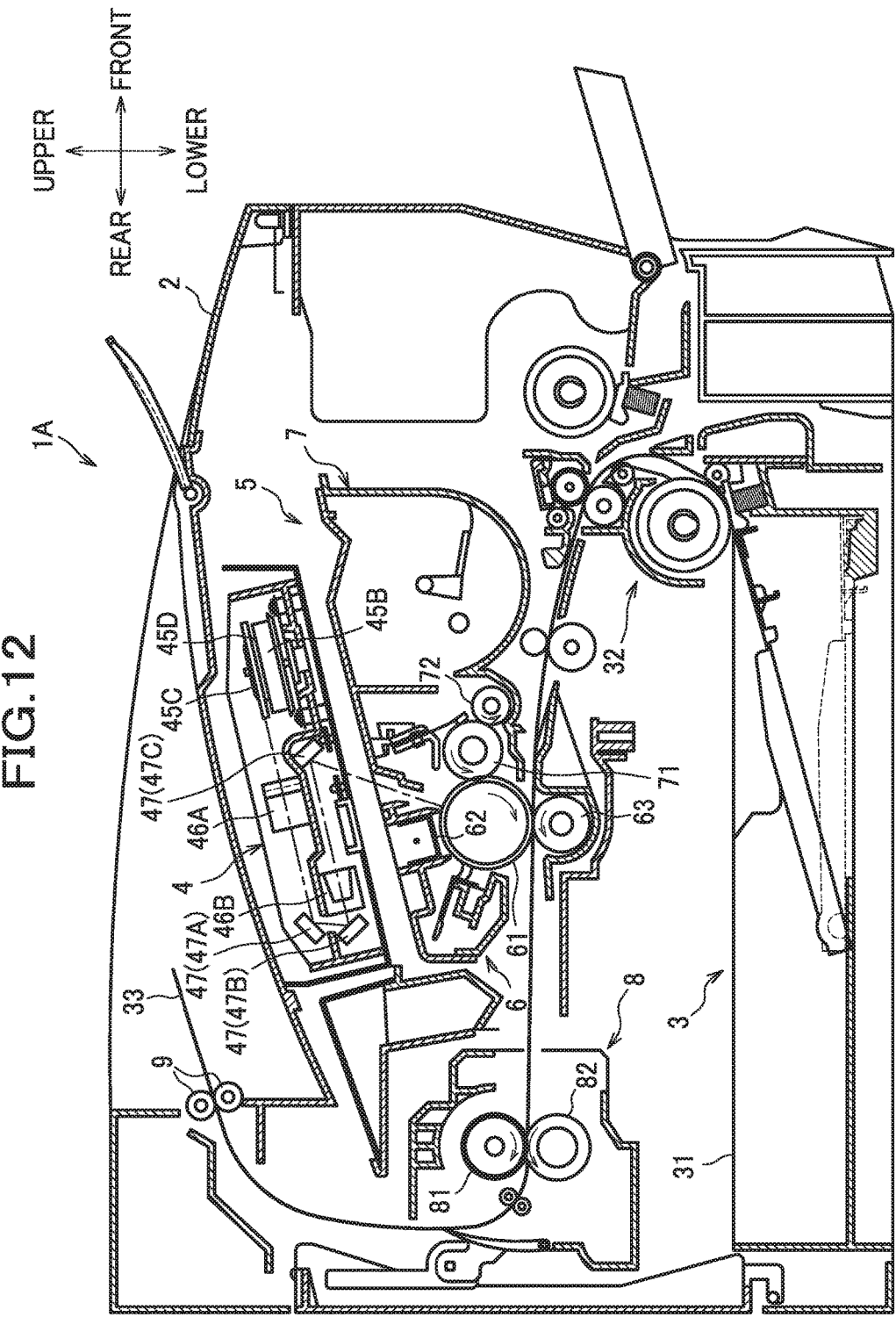
FIG. 12 is a sectional view showing the structure of an image forming apparatus equipped with the reflecting mirror.

As seen in FIG. 12, the reflecting mirror 47 configured as described above may be used in an optical scanner 4 of a laser printer 1A. In this illustrative example, parts similar to those previously described in the laser printer 1 according to the above illustrative example are denoted by the same reference numerals and detailed description thereof will be omitted.

The optical scanner 4 mainly includes a light source (not shown) configured to emit a light beam, a polygon mirror 45D configured to deflect the light beam in the main scanning direction, a plurality of lenses 46A, 46B configured to bring the deflected light beam into focus on the surface of the photoconductor drum 61, and a plurality of reflecting mirrors 47 (47A, 47B, 47C). As shown by the alternate long and short dash lines in the figure, the light beam emitted from the light source is deflected in the main scanning direction by the polygon mirror 45D, and then passes through the lens 46A and is reflected toward the lens 46B by the reflecting mirrors 47A, 47B. Thereafter, the light beam passes through the lens 46B, and is reflected by the reflecting mirror 47c to scan the surface of the photoconductor drum 61 at high speeds.

According to the reflecting mirror 47 configured as described above, since the surface roughness of the second region 112 is greater than that of the first region 111, the second region 112 can provide a larger surface area as compared with an alternative configuration in which the surface roughness of the second region 112 is the same as that of the first region 111. This allows light to be excellently reflected by the reflection coating RC that is formed on the first region 111 having a smaller surface roughness, while the adhesion between the substrate 470 and the reflection coating RC can be improved at the second region 112 with the help of its increased surface area. It should be noted that the reflecting mirror may also be formed such that the second region is provided entirely along at least one edge of the first surface of the substrate.

It will be appreciated by a person skilled in the art that many variations, additions, modifications, and other applications may be made to what has been particularly shown and described herein by way of examples, without departing from the scope of the inventions. Therefore, it is intended that the scope of the present invention, as defined by the attached claims, includes foreseeable combination of features, variations, additions, modifications, or applications.

What is claimed is:

1. A polygon mirror comprising a substrate having a plurality of side surfaces, a first base surface connecting to the plurality of side surfaces, and a second base surface connecting to the plurality of side surfaces, the first base surface and the second base surface facing away from each other, each side surface having a first region, and a second region adjoining the first region and extending between the first region and at least one edge of the side surface, wherein the substrate is made of plastic, and a reflection coating is formed on the first region and the second region, wherein a surface roughness of the second region of the substrate is greater than a surface roughness of the first region of the substrate, wherein the substrate has a first connecting portion connecting the side surface and the first base surface, and a second connecting portion connecting the side surface and the second base surface, wherein a radius of curvature of the first connecting portion is greater than a radius of curvature of the second connecting portion, and wherein the second region extends entirely along a second edge along which the side surface connects to the second base surface.

2. The polygon mirror according to claim 1, wherein the side surface has a first edge along which the side surface connects to the first base surface and, a second edge along which the side surface connects to the second base surface, and wherein the second region extends entirely along at least one of the first edge and the second edge of the side surface.

3. The polygon mirror according to claim 2, wherein the second region extends on each side of the first region entirely along the first edge and the second edge of the side surface.

4. The polygon mirror according to claim 1, wherein an angle made by the side surface and the first base surface is greater than an angle made by the side surface and the second base surface, and wherein the second region extends entirely along a second edge along which the side surface connects to the second base surface.

5. The polygon mirror according to claim 1, wherein the reflection coating is contiguously formed from the side surface to the first base surface and to the second base surface.

6. The polygon mirror according to claim 1, wherein the second region has a groove extending entirely along the at least one edge of the side surface.

7. The polygon mirror according to claim 1, wherein the surface roughness of the first region is equal to or less than Ra 0.1 µm.

8. The polygon mirror according to claim 1, wherein the surface roughness of the second region is equal to or more than Ra 0.5 µm.

9. A polygon mirror comprising a substrate having a plurality of side surfaces, a first base surface connecting to the plurality of side surfaces, and a second base surface connecting to the plurality of side surfaces, the first base surface and the second base surface facing away from each other, each side surface having a first region, and a second region adjoining the first region and extending between the first region and at least one edge of the side surface, wherein the substrate is made of plastic, and a reflection coating is formed on the first region and the second region, wherein a surface roughness of the second region of the substrate is greater than a surface roughness of the first region of the substrate, wherein an angle made by the side surface and the first base surface is greater than an angle made by the side surface and the second base surface, and wherein the second region extends entirely along a second edge along which the side surface connects to the second base surface.

10. The polygon mirror according to claim 9, wherein the side surface has a first edge along which the side surface connects to the first base surface and, a second edge along which the side surface connects to the second base surface, and wherein the second region extends entirely along at least one of the first edge and the second edge of the side surface.

11. The polygon mirror according to claim 10, wherein the second region extends on each side of the first region entirely along the first edge and the second edge of the side surface.

12. The polygon mirror according to claim 9, wherein the reflection coating is contiguously formed from the side surface to the first base surface and to the second base surface.

13. The polygon mirror according to claim 9, wherein the second region has a groove extending entirely along the at least one edge of the side surface.

14. The polygon mirror according to claim 9, wherein the surface roughness of the first region is equal to or less than Ra 0.1 μm.

15. The polygon mirror according to claim 9, wherein the surface roughness of the second region is equal to or more than Ra 0.5 μm.

* * * * *